(12) United States Patent
Ferguson et al.

(10) Patent No.: US 9,259,136 B1
(45) Date of Patent: Feb. 16, 2016

(54) FRAME CONSTRUCTION METHOD AND FRAME ASSEMBLY FOR DISHWASHER

(71) Applicant: Meiko USA, Inc., LaVergne, TN (US)

(72) Inventors: Mark A. Ferguson, Rockvale, TN (US); Dwayne A. Becknell, Kingston Springs, TN (US)

(73) Assignee: Meiko USA, Inc., LaVergne, TN (US)

( * ) Notice: Subject to any disclaimer, the term of this patent is extended or adjusted under 35 U.S.C. 154(b) by 434 days.

(21) Appl. No.: 13/786,805

(22) Filed: Mar. 6, 2013

(51) Int. Cl.
*A47L 15/00* (2006.01)
*A47L 15/42* (2006.01)
*F16B 7/04* (2006.01)
*A47L 15/50* (2006.01)

(52) U.S. Cl.
CPC .......... *A47L 15/0081* (2013.01); *A47L 15/4253* (2013.01); *A47L 15/50* (2013.01); *F16B 7/0493* (2013.01)

(58) Field of Classification Search
CPC ............ A47L 15/4253; A47L 15/0081; F16B 7/0493; F16B 2012/406; F16B 12/30
See application file for complete search history.

(56) References Cited

U.S. PATENT DOCUMENTS

| | | | |
|---|---|---|---|
| 1,456,800 A | 5/1923 | Headley | |
| 2,477,997 A * | 8/1949 | McArthur | A47C 4/02 403/217 |
| 3,837,754 A | 9/1974 | Malcik | |
| 4,169,573 A | 10/1979 | Frieberg | |
| 5,536,097 A | 7/1996 | Hazan | |
| 5,609,174 A | 3/1997 | Ferguson | |
| 5,732,724 A | 3/1998 | Becknell | |
| 5,904,162 A | 5/1999 | Ferguson et al. | |
| 6,012,567 A | 1/2000 | Ferguson et al. | |
| 6,164,301 A | 12/2000 | McFadden et al. | |
| 6,591,846 B1 | 7/2003 | Ferguson et al. | |
| D583,224 S | 12/2008 | Holdsworth | |
| 2006/0037631 A1 * | 2/2006 | Kramer | A47L 15/0081 134/56 D |

FOREIGN PATENT DOCUMENTS

FR    2582752 A1    12/1986

OTHER PUBLICATIONS

"NSF/ANSI 2—2012 Food Equipment", NSF International Standard/American National Standard for Food Equipment, Copyright 2012 NSF International, Published by NSF International, P.O. Box 130140, Ann Arbor, Michigan 48113-0140, USA.

* cited by examiner

*Primary Examiner* — Michael Barr
*Assistant Examiner* — Spencer Bell
(74) *Attorney, Agent, or Firm* — Lucian Wayne Beavers; Garrett M. Hausman; Patterson Intellectual Property Law, PC

(57) ABSTRACT

A tubular frame assembly for a door type warewashing machine includes four tubular legs, and two upper cross-braces and two lower cross-braces. The cross-braces are received through cross-brace receiving openings in the tubular legs, and the cross-braces are bolted together within the legs by nut and bolt assemblies.

14 Claims, 8 Drawing Sheets

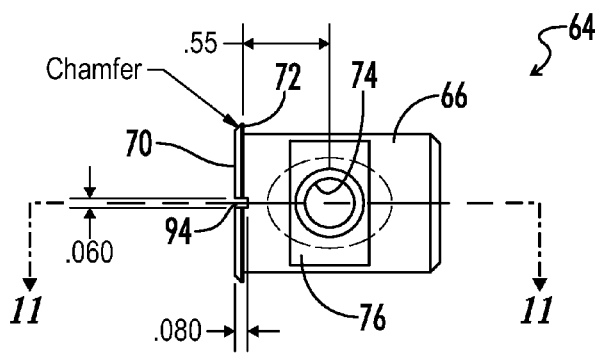
*FIG. 8*
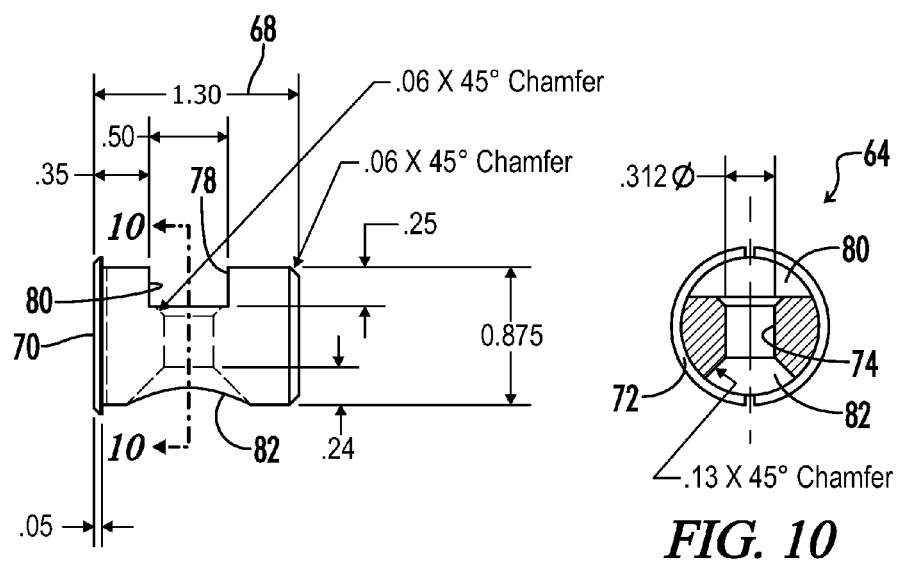
*FIG. 9*
*FIG. 10*

FRAME CONSTRUCTION METHOD AND FRAME ASSEMBLY FOR DISHWASHER

BACKGROUND OF THE INVENTION

1. Field of the Invention

The present invention relates generally to support frame apparatus for dishwashers, and more particularly to a frame assembly that can be disassembled and repaired in the field.

2. Description of the Prior Art

Door type dishwashers, which may also be referred to as warewashers, require a relatively tall supporting framework which supports a ware rack receiving station at a table top height so that ware racks full of dishes or other table ware may slide laterally from an adjacent work table to the rack receiving station and subsequently from the rack receiving station back to another adjacent work table.

The supporting framework of such door type warewashers is sometimes damaged during transport and/or movement of the warewasher. The damaged framework may make the warewasher unusable and require an entire new framework to be obtained from the factory for replacement, or may require return of the warewasher to the factory for repair.

SUMMARY OF THE INVENTION

The present invention provides a frame construction method for a tubular support frame that can be assembled without welding and which can subsequently be disassembled for repair. The frame is constructed in such a manner as to provide smooth cleanable joints between the various tubular members of the framework, which provides a framework that complies with NSF Criteria 2 in regards to cleanability of the framework. A lightweight rigid easily manufactured and easily repaired frame assembly is provided.

In one embodiment a washing machine apparatus includes an open top wash tank and a rack receiving station located above the wash tank and configured to laterally receive a ware rack and to support the ware rack during a wash operation. A frame assembly is configured to support the wash tank from a floor. The frame assembly includes four legs, each leg having a lower end for engaging the floor and an upper end attached to the tank. Each leg has a tubular leg portion including an outer wall defining an interior. The outer wall has an upper cross-brace opening defined therein and a lower cross-brace opening defined therein. The lower cross-brace opening is oriented 90° from the upper cross-brace opening about a longitudinal axis of the leg. The frame assembly includes two upper cross-braces each having two tubular ends received in the upper cross-brace openings of two of the four legs. The frame assembly includes two lower cross-braces each having two tubular ends received in the lower cross-brace openings of two of the legs. A hidden nut and bolt assembly is received within the interior of each leg and bolts together the two cross-brace ends received within the interior of the leg.

In another embodiment a frame assembly comprises a main tubular member having an outer wall and a longitudinal axis. The outer wall has first and second transverse openings defined through the outer wall. The first and second transverse openings are axially spaced along the longitudinal axis and angularly spaced about the longitudinal axis. First and second cross-braces each have an end received in the first and second transverse openings, respectively, so that the ends of the cross-braces are located inside the main tubular member. A first plug is received in the end of the first cross-brace. The first plug has a first transverse bore therethrough. A second plug is received in the end of the second cross-brace. The second plug has a second transverse bore therethrough. An insert nut is received in the first transverse bore, the insert nut having a female thread. A bolt is received through the second transverse bore of the second plug and threadedly engaged with the female thread of the insert nut to hold the main tubular member and the cross-braces together.

In another embodiment a frame assembly comprises four tubular legs. Each leg has an upper cross-brace opening defined therein and a lower cross-brace opening defined therein. The lower cross-brace opening is oriented 90° from the upper cross-brace opening about a longitudinal axis of the leg. The frame assembly includes two tubular upper cross-braces each having two ends received in the upper cross-brace openings of two of the four legs. The frame assembly includes two tubular lower cross-braces having two ends received in the lower cross-brace openings of two of the legs. The frame assembly includes upper and lower substantially identical plugs received in the ends of the upper and lower cross-braces, respectively. The plugs have transverse bores therethrough. An insert nut is received from above into the transverse bore of each of the upper plugs. The insert nut has a female thread. A threaded bolt is received from below through the transverse bore of each of the lower plugs and is made up with the female thread of one of the insert nuts to hold the cross-braces and their associated leg together.

In another embodiment a method of field repair of a frame assembly of a warewashing machine is provided. The frame assembly includes four tubular legs, two upper cross-braces and two lower cross-braces. Each leg has two transverse openings receiving one of the upper cross-braces and one of the lower cross-braces. Each leg includes a nut and bolt received within the leg and bolting the associated cross-braces together. The method comprises the steps of:

(a) unbolting the cross-braces within at least one of the legs;

(b) removing and replacing at least one damaged leg or cross-brace; and (c) bolting back together the cross-braces unbolted in step (a).

In any of the above embodiments the frame assembly may have a height configured to support a rack receiving station at an elevation above a ground level in the range of from 33 to 36 inches, such that the rack receiving station can laterally receive a ware rack from an adjacent work table.

In any of the above embodiments the upper and lower cross-braces associated with a leg may receive upper and lower substantially identical plugs in the ends of the cross-braces.

In any of the above embodiments the plugs may be substantially solid cylindrical plugs closely received in the ends of the cross-braces to prevent the ends of the cross-braces from being crushed by forces created by making up a nut and bolt assembly.

In any of the above embodiments the legs and the cross-braces may be cylindrical tubular members.

In any of the above embodiments each of the upper plugs may include a lateral recess communicated with a transverse bore of the upper plug, the lateral recess having flat walls such that an insert nut is received in the lateral recess and engaged with the flat walls to prevent rotation of the nut.

In any of the above embodiments the plugs may have flanged ends including a flange to limit insertion of the plug into its associated cross-brace.

In any of the above embodiments the flanged end of each plug may have a slot defined therein, the slot being aligned with the transverse bore of the plug to provide a visual indication of transverse bore alignment and to receive a tool to rotate the plug within its associated cross-brace to adjust transverse bore alignment of the plug within its associated cross-brace.

In any of the above embodiments the cross-braces may be closely received in the transverse openings of the legs thereby forming a smooth cleanable joint between the legs and cross-braces, the smooth cleanable joint being compliant with NSF Criteria 2.

In any of the above embodiments the leg may include a removable foot closing a lower end of the leg, the foot being removable to allow access to a nut and bolt assembly within the leg for assembly and reassembly of the frame assembly.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 8 is a top plan view of one of the end plugs.

FIG. 9 is a side elevation view of the end plug of FIG. 8.

FIG. 10 is a sectioned view taken along line 10-10 of FIG. 9 showing details of the transverse bore of the plug.

DETAILED DESCRIPTION

Figure 1:
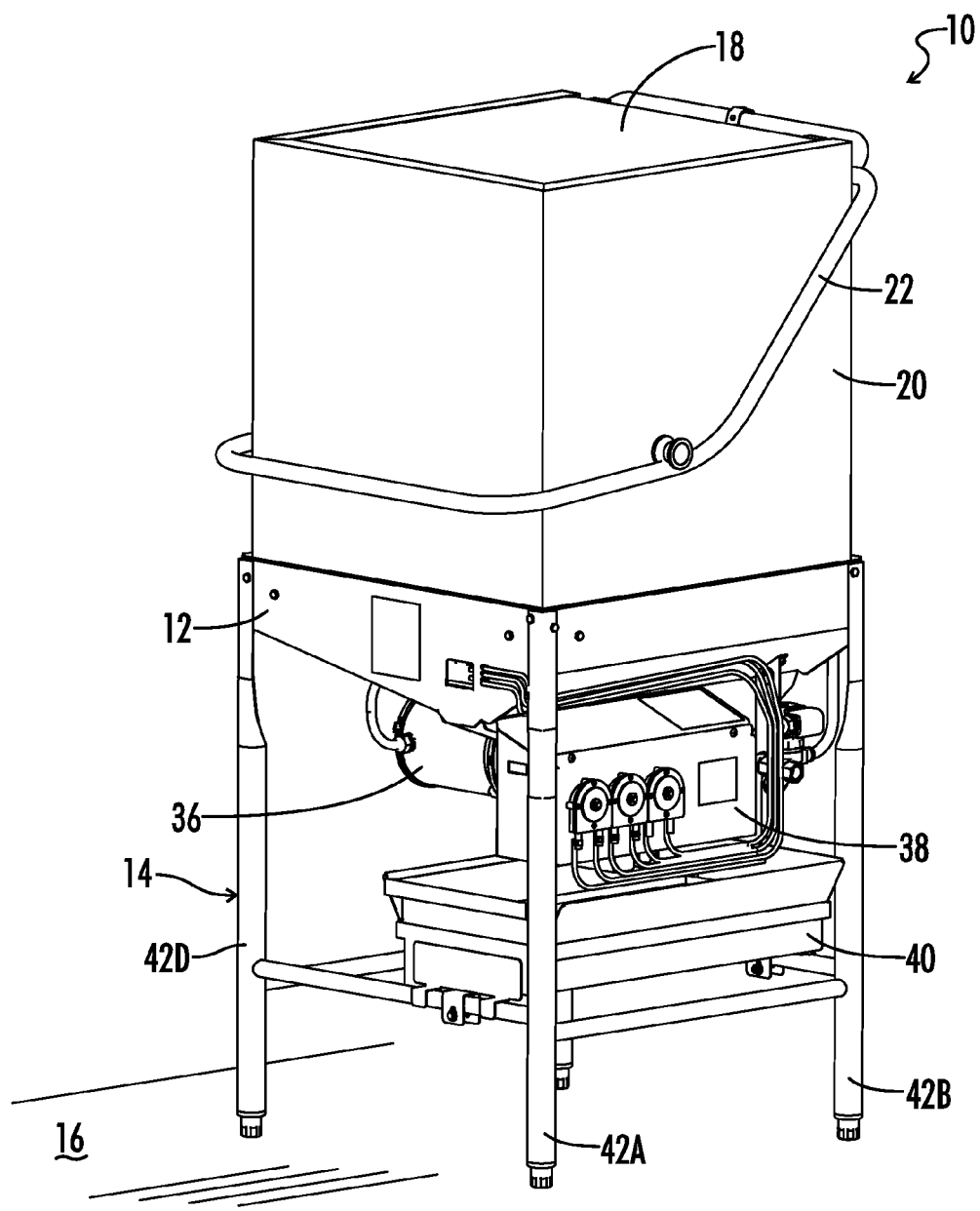
FIG. 1 is a perspective view of a warewashing machine including a tubular frame assembly which may be disassembled.
Figure 2:
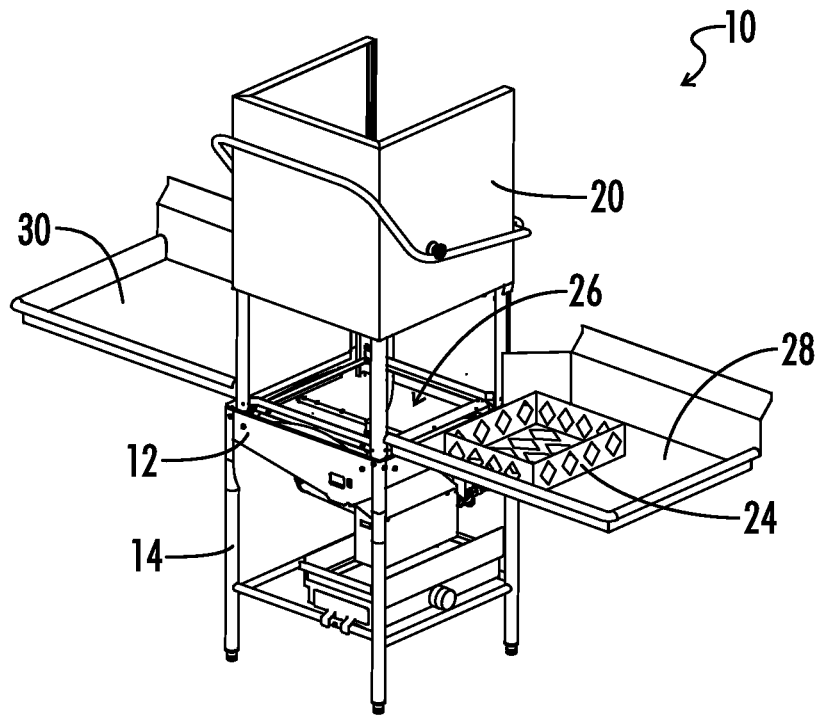
FIG. 2 is a perspective view of the warewashing machine of FIG. 1, with the door in an open position showing a rack receiving station, and showing work tables on opposite sides of the warewashing machine in a pass through arrangement.
Figure 3:
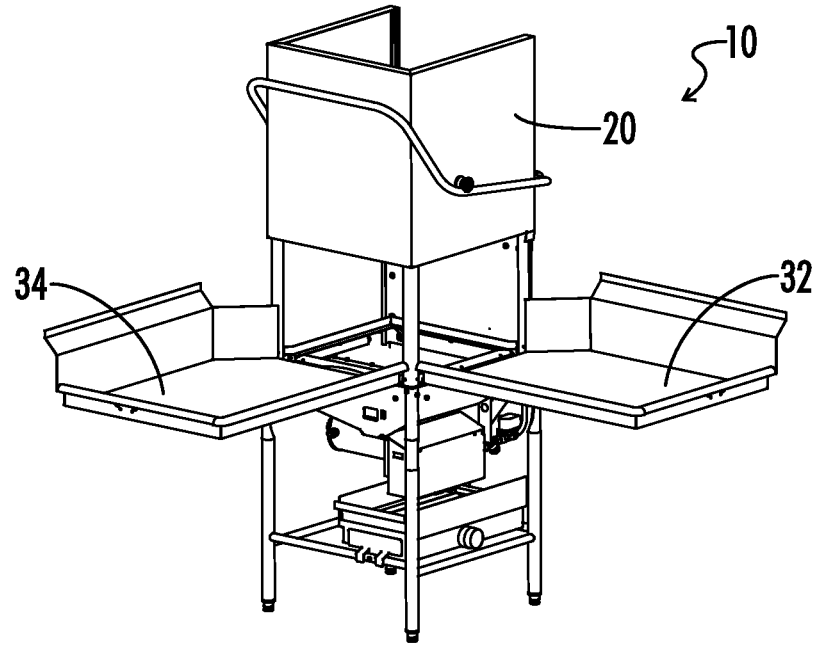
FIG. 3 is a view similar to FIG. 2 showing the warewashing machine and two adjacent work tables in a corner arrangement.

Referring now to the drawings and particularly to FIGS. 1-3, a warewashing machine is shown and generally designated by the numeral 10. The washing machine 10 includes an open top wash and rinse tank 12 supported by a frame assembly 14 from a floor 16. Extending up from the tank 12 is an upper housing 18, three sides of which are closed by a door 20 which can be raised by lifting a handle 22.

As best seen in FIGS. 2 and 3, when the door 20 is in the open or raised position, a ware rack such as 24 can be laterally received through the open door into a rack receiving station 26 located above the wash and rinse tank 12.

In FIG. 2, the washing machine 10 is set up in a pass through arrangement between two adjacent work tables 28 and 30 on opposite sides of the washing machine 10. Thus using the arrangement of FIG. 2, a ware rack 24 may be staged on the first work table 28 and filled with dishes or other tableware. Then, the door 20 is opened as shown in FIG. 2, the rack 24 slides laterally into the rack receiving station 26, the door 20 is closed and the wash cycle is performed. Then, the door 20 is reopened and the rack of washed dishes can move to the left out of the rack receiving station 26 onto the second adjacent work table 30.

Using the corner arrangement of FIG. 3, incoming ware racks may be staged on a first work table 32 for placement into the washing machine 10. After the dishware within the rack is washed, the rack may exit the washing machine 10 onto the second adjacent table 34, with the exiting direction being oriented at 90° to the incoming direction for the ware racks.

In either the pass through arrangement of FIG. 2 or the corner arrangement of FIG. 3, the work tables are typically located at a work table elevation in a range of from about 33 to about 36 inches above the floor 16, and thus the frame assembly 14 of the washing machine must support the rack receiving station 26 at an elevation substantially the same as the adjacent work tables so that the ware racks 24 may slide laterally to and from the rack receiving station 26.

As is further apparent in FIG. 1, many of the auxiliary components of the washing machine 10 are located below the wash tank 12 within the confines defined by the frame assembly 14. Those auxiliary components include a wash pump motor 36, a control box 38, and a drain pan 40. It is noted that the drain pan 40 is supported from two of the cross-braces of the frame assembly 14.

The frame assembly 14 includes four tubular legs 42A, 42B, 42C and 42D. Each leg has an upper end portion 44 for attachment to the tank 12, and a lower end portion 46 for engaging the floor 16.

Figure 4:
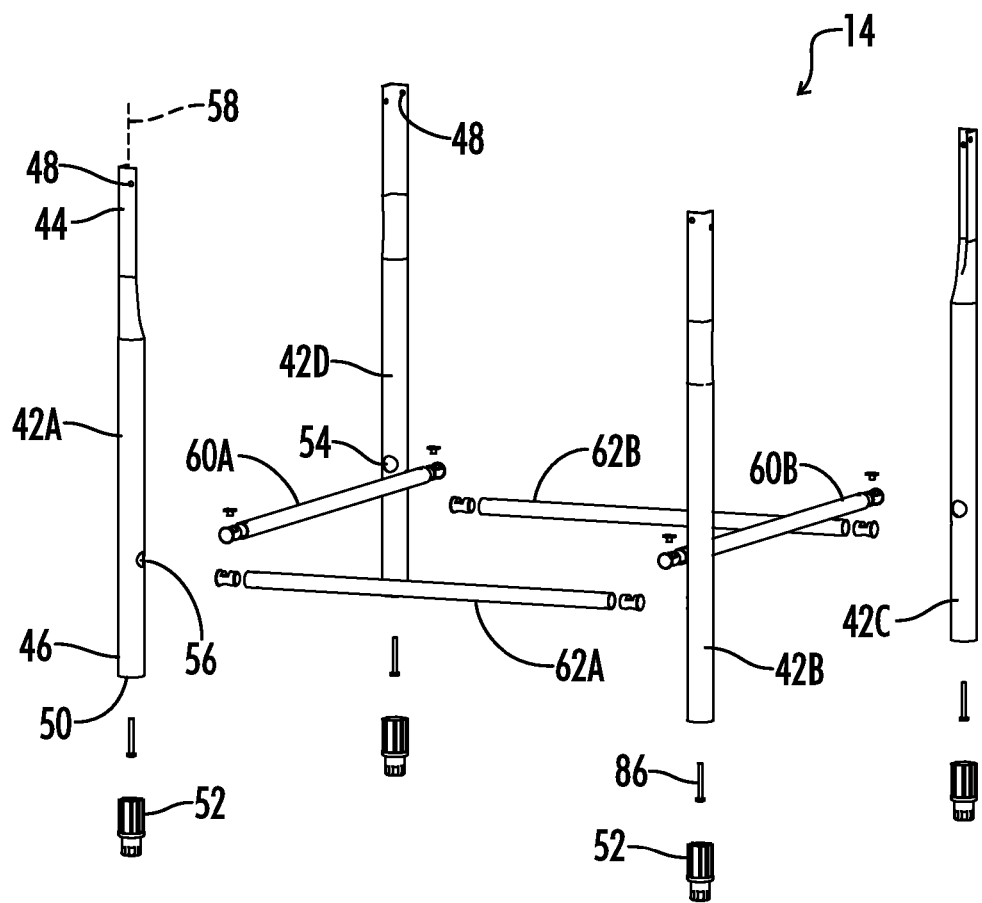
FIG. 4 is an exploded perspective view of the frame assembly. It is noted that in FIG. 4 the frame assembly has been rotated 90° relative to the position shown in FIG. 1.

Each leg may be formed from a cylindrical tubular member, which has been deformed into a closed right angle shaped structure at its upper end portion 44 as best seen in FIG. 4. The right angle shaped upper end portions 44 are configured to receive the corners of the generally rectangular shaped wash tank 12 and to be attached thereto by screws or bolts received in openings such as 48 defined in the upper portions of the legs.

It is noted that when a leg or a cross-brace is referred to herein as tubular, this does not require that the entire length of the member be an open tube of uniform cross-section. It only requires that some substantial portion of the member be tubular having a continuous outer wall defining an interior cavity. As explained above the tubular legs may have their upper portions 44 deformed to create a mounting point for the corners of the tank 12. A tubular member may also have other non-tubular structural members attached thereto to form the complete leg or cross-brace.

The lower portions 46 of the legs have an open lower end 50 which is closed by a removable foot 52.

Each of the legs 42A-42D has an upper cross-brace opening 54 and a lower cross-brace opening 56 defined therein. The lower cross-brace opening 56 is oriented 90° from the upper cross-brace opening 54 about a longitudinal axis such as 58 of the leg.

The frame assembly 14 includes two tubular upper cross-braces 60A and 60B which are received in the upper cross-brace openings 54 of the legs 42A-42D, and two tubular lower cross-braces 62A and 62B which are received in the lower cross-brace openings 56 of the legs 42A-42D.

The legs and cross-braces may be formed from round stainless steel tubing. Other shapes of tubing, such as square tubing, could also be used.

Figure 6:
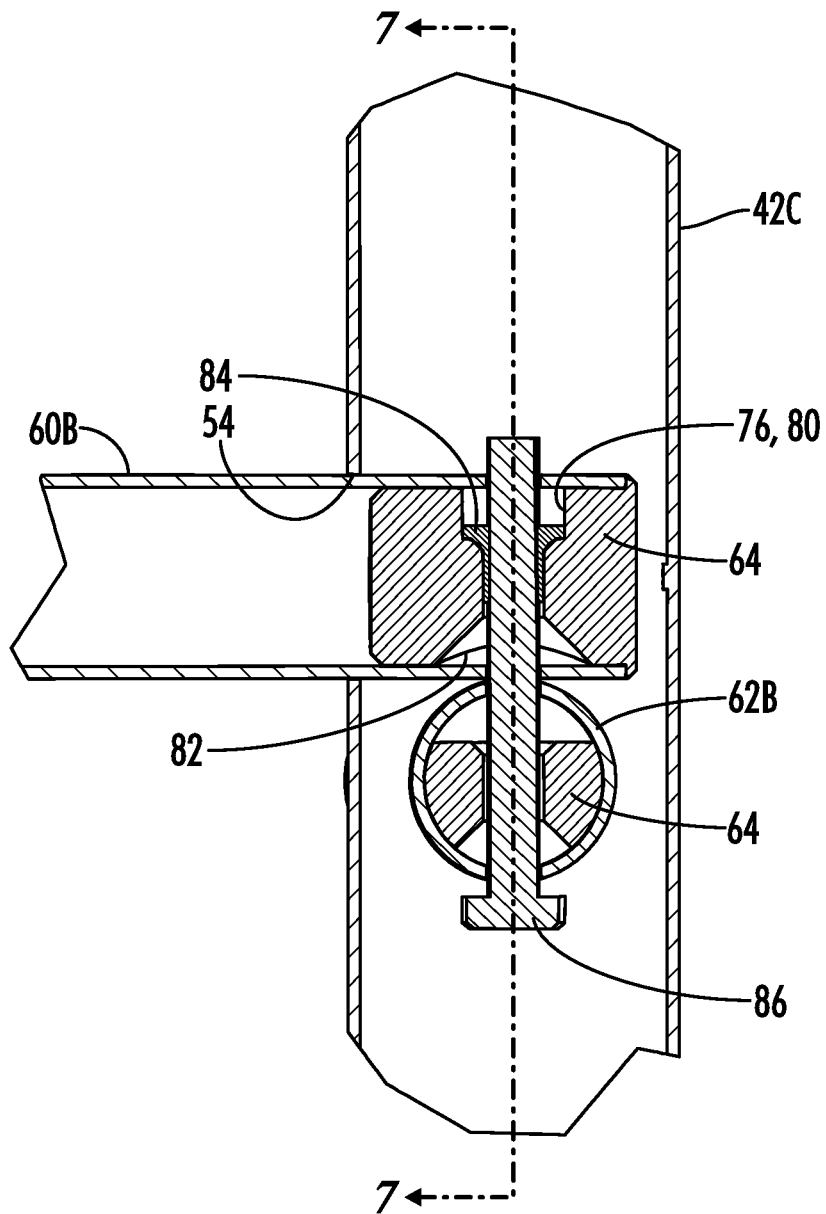
FIG. 6 is an elevation sectioned view of a made up joint of two cross-braces and one leg.
Figure 7:
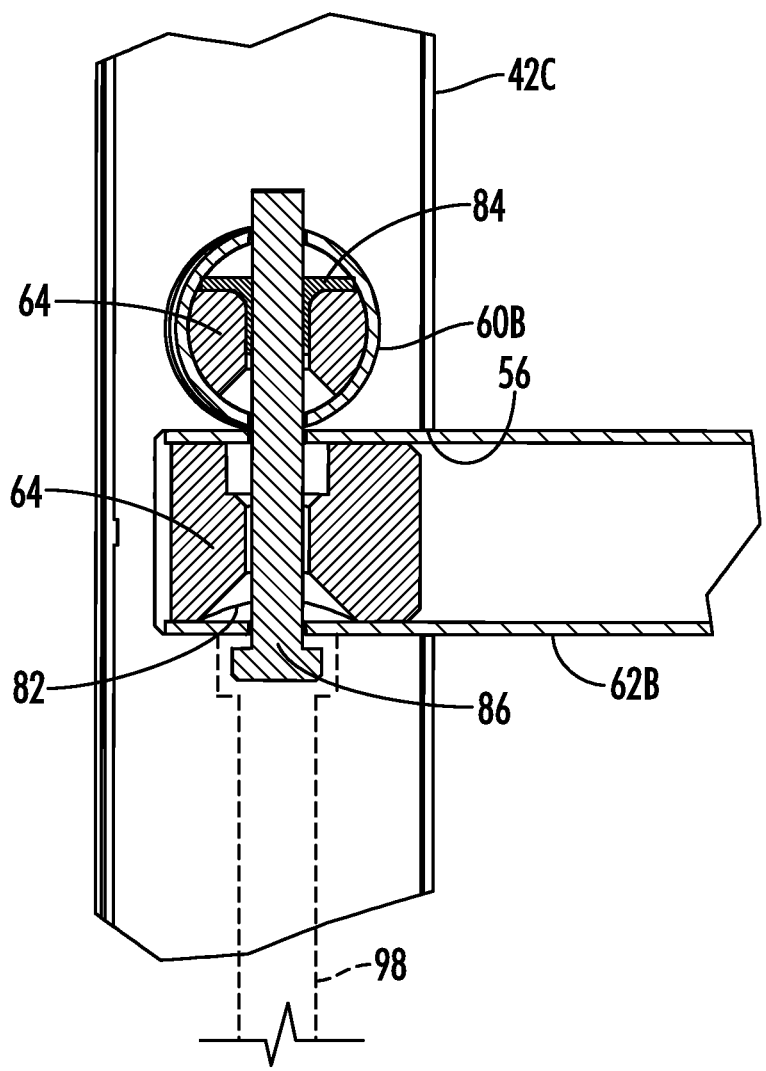
FIG. 7 is another elevation sectioned view taken along lines 7-7 of FIG. 6.

As is best shown in the elevation sectioned views of FIGS. 6 and 7, the upper and lower cross-brace openings 54 and 56 are axially spaced along their respective legs so that when the upper and lower cross-braces are received therein, the cross-braces touch each other when they are bolted together.

Figure 5:
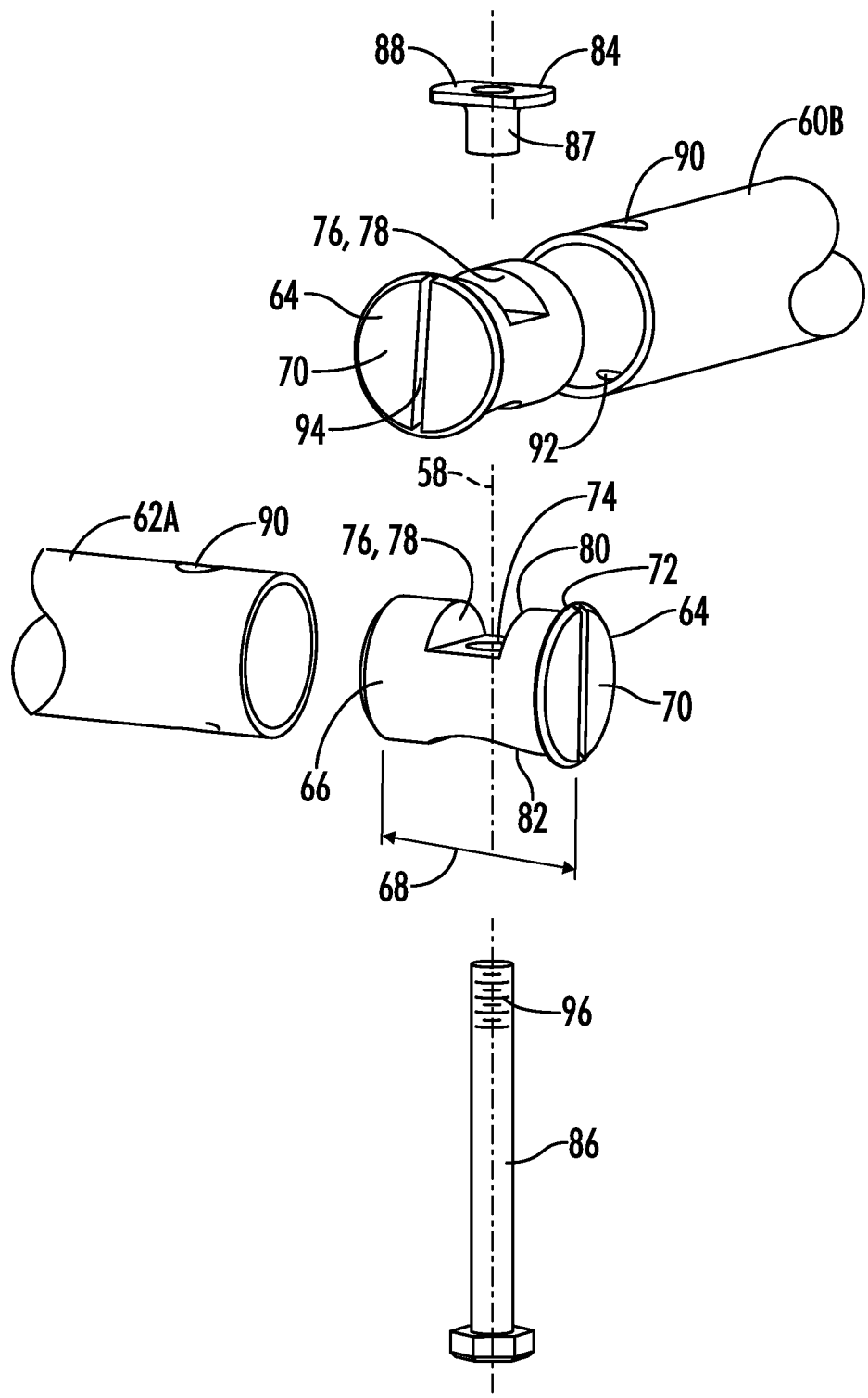
FIG. 5 is an exploded perspective view of two cross-braces, two plugs and a nut and bolt assembly.

As best seen in the enlarged view of FIG. 5, the cross-braces are cylindrical tubular members having open ends within which are received plugs 64. The plugs are substantially solid cylindrical plugs closely received in the ends of the cross-braces to prevent the ends of the cross-braces from being crushed by the forces created by bolting the cross-braces together within the legs. The plugs may be formed for example by injection molding from polypropylene, nylon 6-6, PVC, or any other suitable plastic material.

The details of construction of the plugs 64 are best seen in FIGS. 8-12. Each plug has a substantially cylindrical body 66 having a length 68. Each plug may have a flanged outer end 70 defining a radially outward extending flange 72 configured to limit the insertion of the plug 64 into its associated cross-brace 60 or 62.

Each plug 64 has a transverse bore 74 therethrough. Each plug may include a lateral recess 76 defined between flat walls such as 78 and 80 at one end of its transverse bore 74. Each plug may have a generally oval shaped recess 82 adjacent the other end of its transverse bore 74.

Figure 11:
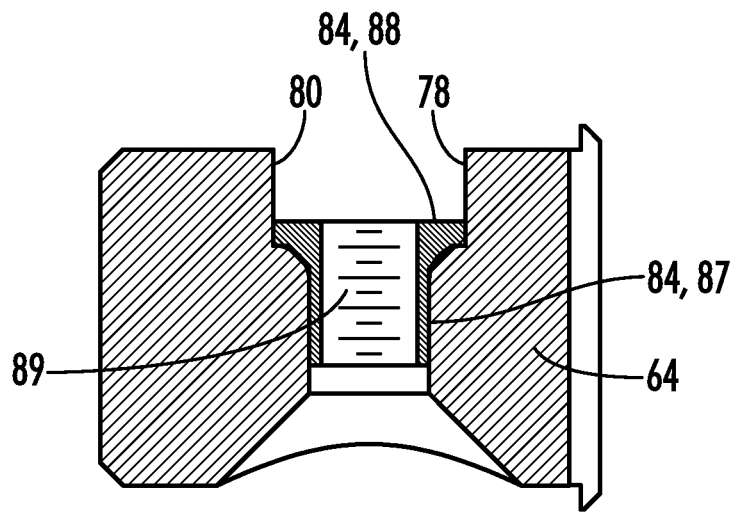
FIG. 11 is a section view along line 11-11 of FIG. 8, showing an insert tee-nut in place within the transverse bore of the plug.
Figure 12:
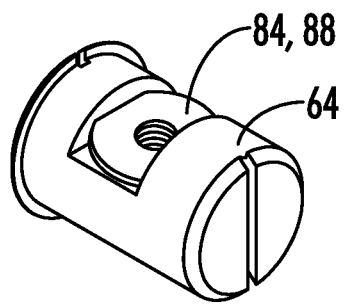
FIG. 12 is a top perspective view of the plug of FIG. 11 with the insert tee-nut in place.

Within each leg 42 a nut 84 and a bolt 86 bolt together the ends of the two cross-braces received within the leg. The nut 84 is a tee-nut 84, which may also be referred to as an insert nut, having a cylindrical portion 87 with an internal female thread 89. The cylindrical portion 87 is received in the upper end of the transverse bore 74 of the plug 64 in one of the upper cross braces 60A or 60B as best seen in FIG. 11. The tee-nut 84 includes a flat generally rectangular cross plate 88 which is closely received between the walls 78 and 80 of the lateral recess 76 so that the tee-nut 84 cannot rotate relative to its associated plug 64.

To assemble the cross-braces 60 and 62 with the legs 42, each of the plugs 64 associated with the upper cross-braces 60A and 60B has one of the tee-nuts 84 placed within the lateral recess 76 of the plug 64, and then the plug 64 is placed within the open end of its upper cross-brace 60A or 60B. It is noted that the upper cross-brace 60A or 60B has a pair of vertically aligned bolt holes 90 and 92 therein. The plug 64 is oriented such that its transverse bore 74 is aligned with the bolt holes 90 and 92. The flanged outer end 70 of the plug 64 may have a slot 94 defined therein which is aligned with the transverse bore 74 of the plug to provide a visual indication of the transverse bore alignment and to receive a tool such as a screw driver to rotate the plug 64 within its associated cross-brace to adjust the transverse bore alignment of the plug 64 within its associated cross-brace.

As noted the plugs 64 may be constructed to be closely received within the ends of the tubular cross-braces. By way of example only, FIGS. 8-10 set forth exemplary dimensions for a plug designed to be closely received within a cross-brace having a nominal 0.875 inch internal diameter. The dimensions set forth on FIGS. 8-10 are in inches.

The lower cross-braces 62A and 62B have their associated plugs 64 placed in their open ends, but the plugs 64 received in the lower cross-braces do not include a tee-nut 84. The plugs 64 received in the lower cross-braces are preferably oriented as shown in FIG. 5 with their lateral recesses 76 located on the upper side thereof and with their transverse bore 74 aligned with bolt holes 90 and 92 found in the lower cross-braces.

Then, the upper and lower cross-braces as assembled with their respective plugs 64 are inserted into the upper and lower cross-brace receiving openings 54 and 56 of their associated legs 42.

Then, an elongated tool 98 (shown in dashed lines in FIG. 7) such as a socket wrench has the bolt 86 assembled therewith and is inserted from below into the open lower end 50 of each of the legs 42 to place the bolt 86 through the bolt holes 90 and 92 of the cross-braces and through the transverse bores 74 of the plugs 64 so that male threads 96 on the upper end of the bolt 86 engage with and make up with the internal female threads 89 in the cylindrical portion 87 of the tee-nut 84 found in the upper cross-brace 60A or 60B. The bolt 86 and tee-nut 84 are then made up to securely bolt the cross-braces together within the interior of the tubular legs 42.

Thus the nut 84 and bolt 86 provide a hidden nut and bolt assembly 84, 86 received within each leg 42 and bolting together the two cross-brace ends received within each respective leg 42.

For purposes of reducing the number of replacement parts in inventory the plugs used in the upper and lower cross-braces may be identical plugs as illustrated. But the upper plug design may be made different from the lower plug design, because the lower plugs do not need to be configured to receive an insert nut.

The external dimensions of the tubular cross-braces 60 and 62, and the internal dimensions of the cross-brace receiving openings 54 and 56 are selected such that the cross-braces are closely received within the cross-brace receiving openings. When the nut and bolt assemblies 84, 86 are snugly made up to connect the cross-braces within each leg, and when the upper ends of the legs 42 are bolted to the tank 12, the frame assembly 14 should be substantially rigid with no looseness at the joints between the cross-braces and the legs, and with there being no readily apparent gaps between the outer surface of the cross-braces and the cross-brace receiving openings.

The joints formed by the cross-braces and the legs should be substantially smooth at the intersection of the cross-braces and the legs so as to provide a cleanable joint that can be wiped clean in a manner sufficient to satisfy the cleanability criteria of NSF International Standard "NSF/ANSI 2-2012", published by NSF International of Ann Arbor, Mich., which standard is referred to herein as NSF Criteria 2. The relevant portions of that standard include the following:

"5.4.3 Joints formed by overlapping sheets of material shall not create upwardly facing horizontal ledges.

5.7.1 Exposed reinforcing and framing members and gussets shall be easily cleanable. Reinforcing and framing members shall be designed and manufactured to prevent the harborage of vermin.

5.7.2 Horizontal surfaces of reinforcing and framing members and gussets shall not be located where debris may accumulate.

5.7.3 Vertical channels that form hollow sections shall be closed at each end, open at each end, or readily accessible along the entire channel. All other hollow sections shall be closed at each end."

After the legs and cross-braces of the frame assembly 14 have been bolted together, the removable foot pieces 52 may be inserted in the lower ends of the legs to close the legs.

In more general terms, each of the tubular legs 42 may be referred to as a main tubular member 42. The cross-brace receiving openings 54 and 56 may also be referred to as first and second transverse openings 54 and 56 which are both axially spaced along the longitudinal axis 58 of the leg and angularly spaced about the longitudinal axis 58 of the leg. In the embodiments illustrated an angular spacing of 90° has been used, but the same basic joint construction may be used with other angular spacings to form a framework having other than a rectangular plan shape.

The construction of the frame assembly 14 just described provides a frame construction that can be assembled without welding thus providing for an economical initial frame construction. Also, the construction of the frame assembly 14 permits the frame assembly 14 or some portion thereof to be disassembled to remove and replace any damaged components of the frame assembly easily in the field. Thus, a service technician may carry a supply of the individual leg and cross-brace components, and may easily replace one or more damaged leg or cross-brace components by simply unbolting the cross-braces within the affected leg, and removing and replacing any damaged legs or cross-braces, then bolting back together the components.

The bolts 86 may be accessed for disassembly by removing the foot pieces 52 from the legs so as to access the bolts 86 from below by an elongated tool 98 such as a socket wrench on an extension.

Thus it is seen that the present invention achieves the objects and advantages mentioned as well as those inherent therein. While certain preferred embodiments of the apparatus and method have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A washing machine apparatus, comprising:
an open top wash tank;
a rack receiving station located above the wash tank and configured to laterally receive a ware rack and to support the ware rack during a wash operation; and
a frame assembly configured to support the wash tank from a floor, the frame assembly including:
four legs, each leg having a lower end for engaging the floor and an upper end attached to the tank, each leg having a tubular leg portion including an outer wall defining an interior, the outer wall having an upper cross-brace opening defined therein and a lower cross-brace opening defined therein, the lower cross-brace opening being oriented 90° from the upper cross-brace opening about a longitudinal axis of the leg;
two upper cross-braces, each having two tubular ends received in the upper cross-brace openings of two of the legs;
two lower cross-braces, each having two tubular ends received in the lower cross-brace openings of two of the legs;
upper and lower plugs received in the tubular ends of the upper and lower cross-braces, respectively, the plugs having transverse bores therethrough; and
a hidden nut and bolt assembly received within the interior of each leg and bolting together the two cross-brace ends received within the interior of the leg, the bolt of the nut and bolt assembly passing through the transverse bores of the upper and lower plugs.

2. The apparatus of claim 1, wherein:
the frame assembly has a height configured to support the rack receiving station at an elevation above the floor in the range of from about 33 to about 36 inches, such that the rack receiving station can laterally receive a ware rack from an adjacent work table.

3. The frame assembly of claim 1, wherein:
the cross-braces are closely received in the transverse openings of the legs thereby forming smooth cleanable joints between the legs and the cross braces, the smooth cleanable joints being compliant with NSF Criteria 2.

4. The frame assembly of claim 1, wherein:
each leg includes a removable foot closing the lower end of the leg, the foot being removable to allow access to the nut and bolt assembly within the leg for disassembling and re-assembling the frame assembly.

5. The apparatus of claim 1, wherein:
the tubular portions of the legs and the tubular ends of the cross-braces are cylindrical.

6. The apparatus of claim 5, wherein:
the plugs are substantially solid cylindrical plugs closely received in the tubular ends of the cross-braces to prevent the ends of the cross-braces from being crushed by forces created by making up the nut and bolt assembly.

7. The apparatus of claim 1, wherein:
each plug has a flanged end including a flange to limit insertion of the plug into its associated cross-brace.

8. The apparatus of claim 7, wherein:
the flanged end of each plug has a slot defined therein, the slot being aligned with the transverse bore of the plug to provide a visual indication of transverse bore alignment and to receive a tool to rotate the plug within its associated cross-brace to adjust transverse bore alignment of the plug within its associated cross-brace.

9. A washing machine apparatus, comprising:
an open top wash tank;
a rack receiving station located above the wash tank and configured to laterally receive a ware rack and to support the ware rack during a wash operation; and
a frame assembly configured to support the wash tank from a floor, the frame assembly including:
four legs, each leg having a lower end for engaging the floor and an upper end attached to the tank, each leg having a tubular leg portion including an outer wall defining an interior, the outer wall having an upper cross-brace opening defined therein and a lower cross-brace opening defined therein, the lower cross-brace opening being oriented 90° from the upper cross-brace opening about a longitudinal axis of the lea:
two upper cross-braces, each having two tubular ends received in the upper cross-brace openings of two of the legs:
two lower cross-braces, each having two tubular ends received in the lower cross-brace openings of two of the legs;
upper and lower plugs received in the tubular ends of the upper and lower cross-braces, respectively, the plugs having transverse bores therethrough; and
a hidden nut and bolt assembly received within the interior of each leg and bolting together the two cross-brace ends received within the interior of the leg, each nut and bolt assembly including:
an insert nut received from above into the transverse bore of each of the upper plugs, the insert nut having a female thread; and
a threaded bolt received from below through the transverse bore of each of the lower plugs and made up with the female thread of one of the insert nuts to hold the cross-braces and their associated leg together.

10. The apparatus of claim 9, wherein:
the tubular portions of the legs and the tubular ends of the cross-braces are cylindrical.

11. The apparatus of claim 10, wherein:
the plugs are substantially solid cylindrical plugs closely received in the tubular ends of the cross-braces to prevent the ends of the cross-braces from being crushed by forces created by making up the bolts and the insert nuts.

12. The apparatus of claim 9, wherein:
each of the upper plugs includes a lateral recess communicated with the transverse bore of the upper plug, the lateral recess having flat walls; and
each of the insert nuts is received in one of the lateral recesses and engaged with the flat walls to prevent rotation of the nut.

13. The apparatus of claim 9, wherein:
each plug has a flanged end including a flange to limit insertion of the plug into its associated cross-brace.

14. The apparatus of claim 13, wherein:
the flanged end of each plug has a slot defined therein, the slot being aligned with the transverse bore of the plug to provide a visual indication of transverse bore alignment and to receive a tool to rotate the plug within its associated cross-brace to adjust transverse bore alignment of the plug within its associated cross-brace.

* * * * *

UNITED STATES PATENT AND TRADEMARK OFFICE
CERTIFICATE OF CORRECTION

| | | |
|---|---|---|
| PATENT NO. | : 9,259,136 B1 | Page 1 of 1 |
| APPLICATION NO. | : 13/786805 | |
| DATED | : February 16, 2016 | |
| INVENTOR(S) | : Ferguson et al. | |

It is certified that error appears in the above-identified patent and that said Letters Patent is hereby corrected as shown below:

Column 8, claim 9, line 43, replace "lea" with --leg--.

Signed and Sealed this
Tenth Day of May, 2016

Michelle K. Lee
*Director of the United States Patent and Trademark Office*